United States Patent [19]
Keller

[11] Patent Number: 5,621,842
[45] Date of Patent: Apr. 15, 1997

[54] OPTICAL FIBER CABLE AND DEVICE FOR MANUFACTURING A CABLE OF THIS KIND

[75] Inventor: David Keller, Vaureal, France

[73] Assignee: Alcatel Cable, Clichy Cedex, France

[21] Appl. No.: 532,144

[22] Filed: Sep. 22, 1995

[30] Foreign Application Priority Data

Sep. 26, 1994 [FR] France .................................. 94 11437

[51] Int. Cl.⁶ ..................................... G02B 6/44
[52] U.S. Cl. .......................... 385/114; 385/111; 385/109; 385/112
[58] Field of Search ..................... 385/100–114

[56] References Cited

U.S. PATENT DOCUMENTS

| | | | |
|---|---|---|---|
| 4,241,979 | 12/1980 | Gagen et al. | 385/114 X |
| 4,715,677 | 12/1987 | Saito et al. | 385/114 |
| 4,878,732 | 11/1989 | Rohner et al. | 385/106 |

FOREIGN PATENT DOCUMENTS

| | | |
|---|---|---|
| 0514091A1 | 11/1992 | European Pat. Off. |
| 0566328A1 | 10/1993 | European Pat. Off. |
| 3839109A1 | 5/1990 | Germany . |
| 58-211713 | 12/1983 | Japan . |
| 58-211712 | 12/1983 | Japan . |
| WO9318424 | 9/1993 | WIPO . |

OTHER PUBLICATIONS

*Patent Abstracts Of Japan*, vol. 008, No. 065 (P-263), 27 Mar. 1984 & JP-A-58 211712 (Nippon Denshin Denwa Kosha; Others: 01) 9 Dec. 1983.

*Patent Abstracts Of Japan*, vol. 008, No. 065 (P-263), 27 Mar. 1984 & JP-A-58 211713 (Nippon Denshin Denwa Kosha; Others: 01) 9 Dec. 1983.

*Primary Examiner*—Phan T. H. Palmer
*Attorney, Agent, or Firm*—Sughrue, Mion, Zinn, Macpeak & Seas

[57] ABSTRACT

An optical fiber cable comprises a stacked plurality of optical fiber ribbons each including a plurality of optical fibers disposed side by side in substantially the same plane and all embedded in a common covering or matrix of the ribbon. A protective outer sheath protects the cable against radial compression loads. Reinforcing members withstand traction loads applied to the cable, which further comprises filler members of a material based on reinforcing fibers and having a coefficient of expansion similar to that of the optical fibers embedded in a connecting matrix. The filler members occupy all or part of a volume delimited by the outside surface of the stacked ribbons and by the inside surface of the outer sheath so that the combination of the stack and the filler members has an external contour in cross-section that is substantially circular. The filler members protect the ribbons against radial and longitudinal loads applied to the cable and oppose contraction of the cable by more than 0.2%.

16 Claims, 4 Drawing Sheets

OPTICAL FIBER CABLE AND DEVICE FOR MANUFACTURING A CABLE OF THIS KIND

BACKGROUND OF THE INVENTION

1. Field of the invention

The present invention concerns an optical fiber cable and a device for manufacturing a cable of this kind. To be more precise, it concerns an optical fiber cable of the type comprising a stacked plurality of optical fiber ribbons. An optical fiber ribbon usually comprises a plurality of optical fibers disposed side by side in substantially the same plane and held together by means of a common matrix in which they are embedded.

2. Description of the prior art

Such cables are described in patent U.S. Pat. No. 4,078,853, for example. They conventionally comprise:

- a stacked plurality of optical fiber ribbons twisted helically upon itself,
- an internal protection tube containing the stacked ribbons and disposed loose therein, i.e. with a large radial clearance, the tube being intended in particular to protect the fibers against external radial and longitudinal loads to which the cable may be subjected, possibly to provide a heat barrier to protect the fibers against excessive heat during manufacture of the cable, and to oppose contraction of the outer sheath that may occur during manufacture thereof, in particular, and more generally when the temperature to which the cable is exposed falls; in practise, to protect the optical fibers it is desirable for the resulting contractions of the cable to be restricted to approximately 0.2%,
- a protective outer sheath to render the cable resistant to radial compression loads, reinforced with reinforcing members to withstand traction loads on the cable to provide mechanical protection of the optical fibers, the reinforcing members having to this end a modulus of elasticity in traction and an elongation at break greater than those of the optical fibers.

The stack of ribbons is placed loose in the internal protection tube so that it is decoupled from the latter if the tube is subjected to longitudinal compression loads, for example. The tube is made from a plastics material having a much higher coefficient of expansion than the optical fibers with the result that the performance of the optical fibers can deteriorate in the presence of high longitudinal traction loads. This problem is avoided by decoupling them from the remainder of the cable. In practise the ratio between the cross-section area of the stack of ribbons and that of the volume delimited by the inside contour of the protective tube is between 0.4 and 0.5.

To minimize ingress of moisture into the cable, since it is known that the optical performance of the fibers is very significantly degraded by the presence of moisture, the internal protective tube can contain a waterblocking material such as a thixotropic gel or filaments adapted to swell in the presence of water.

The structure of conventional cables as just described maintains an acceptable level of optical fiber transmission performance, the various component parts of the cable protecting the fibers against the loads to which they are likely to be subjected in use.

The outside diameter of this type of cable (measured across the outer sheath previously mentioned, and bearing in mind that additional sheaths may be used) is usually in the order of 15 mm to 20 mm while the thickness of the stack of ribbons varies between 3 mm and 6 mm.

At present, a constant concern is reducing the overall size of optical fiber cables so that a greater number of cables can be installed in a conduit of given cross-section in order to increase the transmission capacity of networks.

The diameter of cables having the structure described above is too large.

An object of the present invention is therefore to provide an optical fiber cable of the type comprising a stack of optical fiber ribbons having a diameter less than that of prior art cables for a given thickness of the stack of ribbons without compromising the mechanical and optical properties of the prior art cables.

SUMMARY OF THE INVENTION

To this end the present invention proposes an optical fiber cable comprising:

- a stacked plurality of optical fiber ribbons each including a plurality of optical fibers disposed side by side in substantially the same plane and all embedded in a common covering or matrix of said ribbon,
- a protective outer sheath to protect the cable against radial compression loads,
- reinforcing members for withstanding traction loads applied to the cable, which further comprises filler members of a material based on reinforcing fibers and having a coefficient of expansion similar to that of said optical fibers embedded in a connecting matrix, said filler members occupying all or part of a volume delimited by the outside surface of the stacked ribbons and by the inside surface of said outer sheath so that the combination of said stack and said filler members has an external contour in cross-section that is substantially circular, said filler members being adapted to protect said ribbons against radial and longitudinal loads applied to said cable and to oppose contraction of said cable by more than 0.2%.

For a given thickness of the stack of ribbons, the invention reduces the outside diameter of the cable by at least 20% to 30% compared to prior art cables.

The cable of the invention does not contain any internal protective tube, the filler members of the invention fulfilling this role. This has the benefit of enabling the use of all or part of the space left free between the stack of ribbons and the internal protective tube in the prior art cables. The filler members fulfil the functions of the protective tube, namely protecting the optical fibers against longitudinal and radial loads to which they may be subjected and limiting contraction of the outer sheath. Their modulus of elasticity can, in accordance with the invention, be between 10 000 N/mm$^2$ and 55 000 N/mm$^2$.

The ratio between the cross-section of the stack and that of the volume delimited by the inside contour of the filament members is advantageously between 0.5 and 1. The fact that the ribbons may no longer be loose within the structure to the same degree as in the prior art does not compromise the optical performance of the cable in accordance with the invention. The loose structure of the prior art cables protects the optical fibers against longitudinal loads on the remainder of the cable, especially the component parts of the cable made from plastics materials (in particular the protective tube and the outer sheath). Given that the protective tube is dispensed with and that the filler members contain reinforcing fibers made of a material that has a coefficient of expansion nearer that of the optical fibers than the plastics materials, the proportion of plastics material that can contract or expand in the longitudinal direction is much lower in a given cross-section of the cable of the invention than in the same cross-section of a prior art cable. Thus the fact of using a tighter construction does not degrade optical performance.

The filler members can advantageously fulfil the function of the reinforcing members embedded in the outer sheath of prior art cables so that the latter can be dispensed with in the outer sheath, with the result that the thickness of the outer sheath and therefore the outside diameter of the cable can be reduced. In this case the filler members have a modulus of elasticity in traction and an elongation at break greater than those of the optical fibers.

Other features and advantages of the present invention will emerge from the following description of one embodiment and of a cable manufacturing device of the invention given by way of non-limiting illustrative example only.

DETAILED DESCRIPTION OF THE PREFERRED EMBODIMENTS

In all the figures, parts common to more than one figure are always identified by the same reference number.

Figure 1:
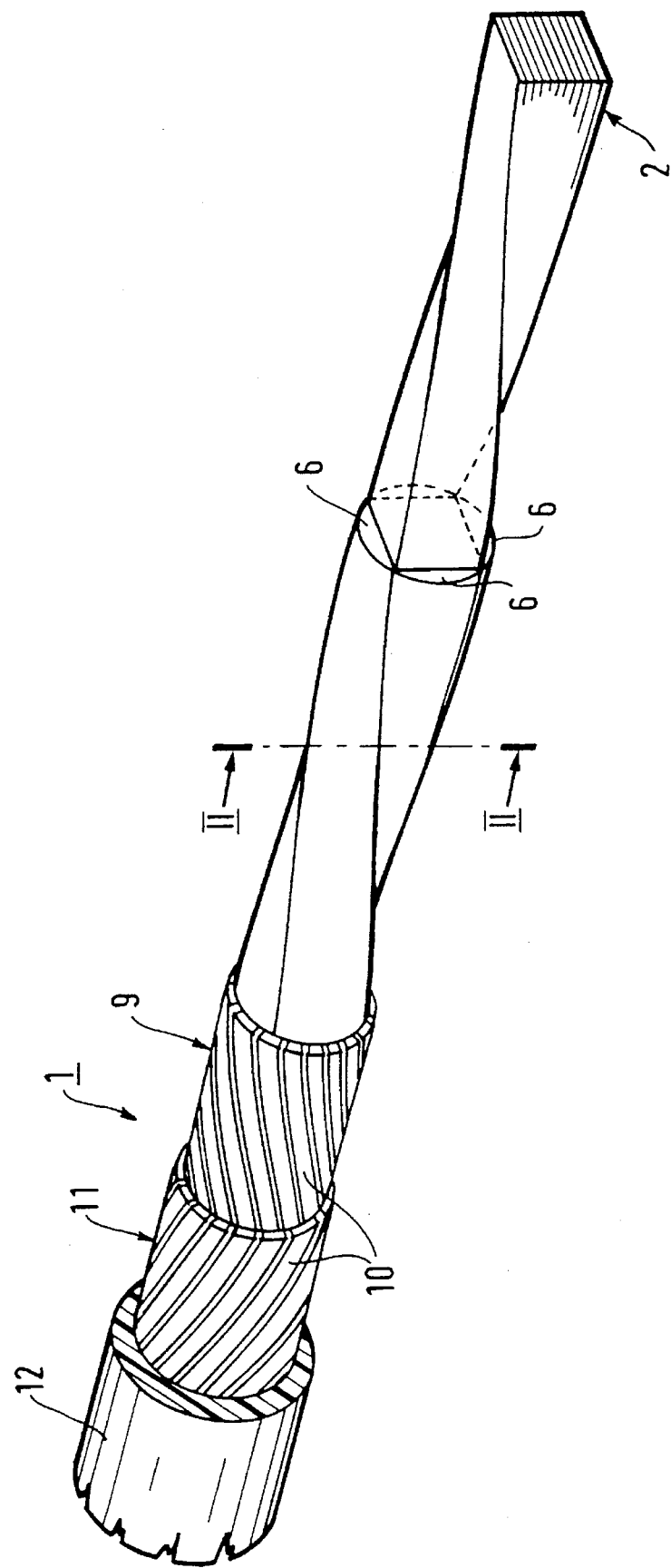
FIG. 1 is a perspective view of a cable of the invention.
Figure 2:
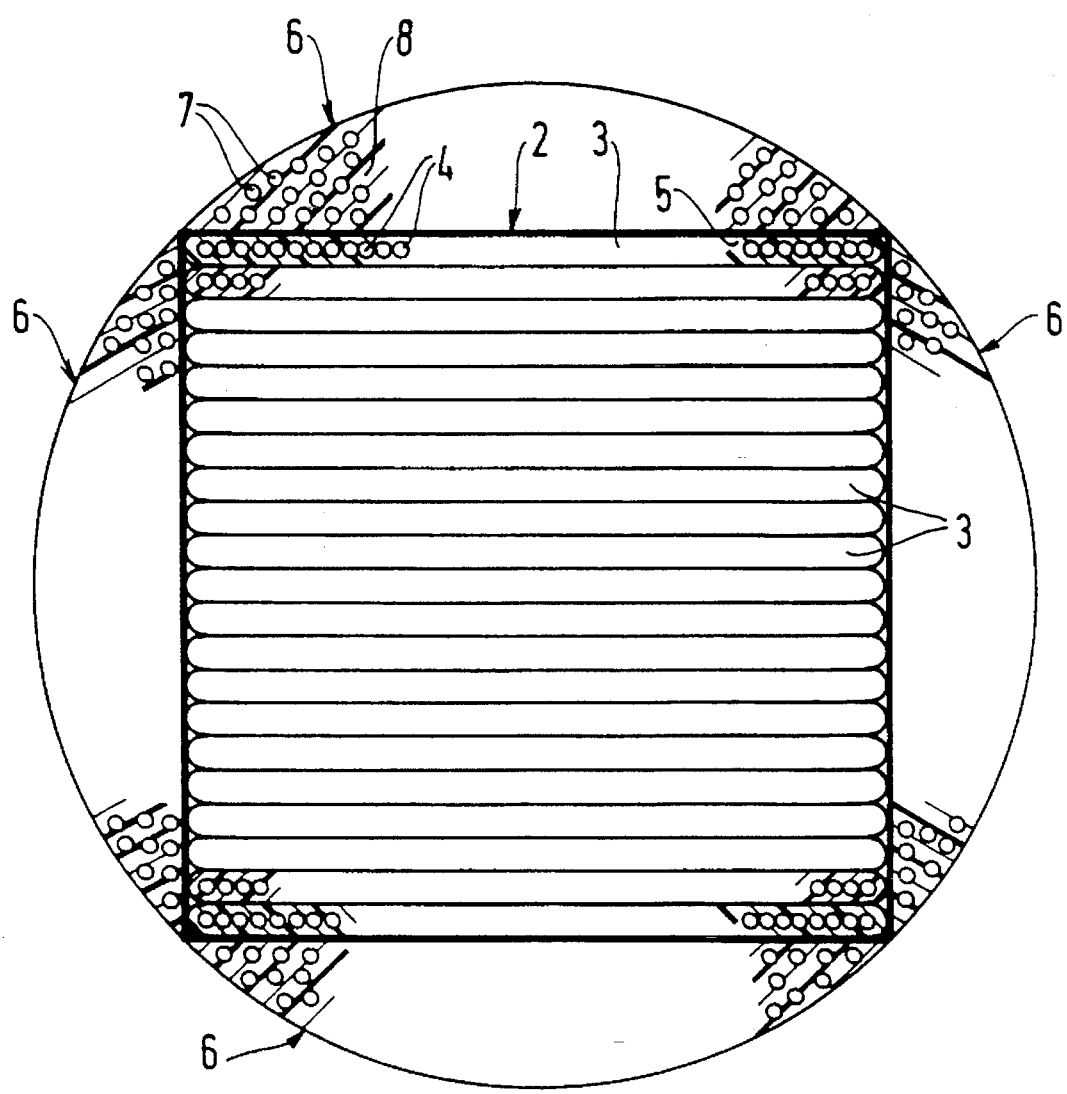
FIG. 2 is a cross-section on the line II—II in FIG. 1.

FIGS. 1 and 2 show a cable 1 of the invention. The cable 1 comprises a stack 2 of ribbons 3 made up of optical fibers 4 (see FIG. 2); it contains up to 18 ribbons, for example. Each ribbon 3 comprises a plurality of optical fibers 4 disposed side by side in a common plane and embedded in a matrix 5. For example, the stack 3 has a cross-section in the order of 3 mm×3.5 mm when it includes 12 ribbons each of 12 fibers, 3 mm×5 mm when it comprises 18 ribbons each of 12 fibers, and 4 mm×5 mm when it comprises 18 ribbons each of 16 fibers.

The stack 3 is twisted helically upon itself with a constant or alternating "SZ" twist to enable the cable 1 to bend without degrading the transmission properties of the optical fibers 4.

The stack 3 is surrounded by four filler members 6 in accordance with the invention. Each of these filler members is made up of fibers 7 made of glass, aramide or other material having a coefficient of expansion similar to that of the optical fibers 4 and embedded in a resin 8 having a high modulus of elasticity so that the modulus of elasticity of the filler members 6 can in practise be between 10 000 N/mm$^2$ and 55 000 N/mm$^2$. The proportion of resin 8 in the cross-section of a filler member 6 is about 10% to 25% so that, as previously mentioned, the total proportion of plastics material in the cross-section of a cable of the invention is substantially reduced as compared to prior art cables.

The fibers 7 can be replaced with more complex filaments, for example strips of glass, aramide or other material fibers embedded in a resin and thereby forming composite filaments which are subsequently embedded in an appropriate material. Such composite filaments are marketed by the company NEPTCO under the registered trademark FLEXLINE, for example. They are supplied in the form of tapes approximately 1.5 mm wide and 0.5 mm thick.

These composite filaments can be embedded in a polyamide-based thermoplastics adhesive material, for example, such as that sold by the company HENKEL under the registered trademark MACROMELT TPX 20-146.

The composite filaments could equally well be embedded in a polyolefin such as an ethylene and propylene copolymer. A material of this kind is sold by the company EASTMAN under the registered trademark M-5F, for example.

The filler members 6 have a sector shape cross-section in the form of a portion of a disk delimited by a chord the length of which is substantially equal either to the height of the stack 2 or to its width, depending on the position occupied in the cable 1 by the filler members 6. The cross-section of the filler members 6 is also such that in combination with the stack 2 they define a substantially circular external contour in cross-section (see FIG. 2). In the example shown, the cross-section of the stack 2 is rectangular.

To protect the ribbons 3, in order to preserve the optical properties of the optical fibers 4 if the temperature of the cable falls, causing it to contract, it is preferable to dispose the filler members 6 in such a way as to leave part of the space around the stack 2 free. This entails a ratio between the cross-section of the stack 2 and that of the volume delimited by the interior contour of the filler members 6 that is preferably between 0.5 and 1. This ratio is higher than that used in prior art cables so that the unused space within the cable and therefore the diameter of the cable are reduced. By choosing filler members 6 with a modulus of elasticity of at least 25 000 N/mm$^2$ and a coefficient of expansion similar to that of the optical fibers, i.e. less than $8 \times 10^{-6}$ if the filler members 6 do not entirely replace the conventional cable reinforcing members incorporated into the outer sheath (see below), or less than $20 \times 10^{-6}$ if the conventional reinforcing members are not used, it is possible to make the ratio just mentioned about 1 (as shown in FIG. 2), i.e. to reduce the diameter of the cable further by restricting the unoccupied space therein. Thus the modulus of elasticity and the coefficient of expansion selected for the filler members 6 enable them to fulfil the functions provided by the protective tube and by the use of a loose structure in the prior art.

The filler members 6 follow the helical or SZ twist of the stack 3.

A first layer 9 of twelve FLEXLINE type (see above) reinforcing tapes 10 is wound helically around the filler members 6, the tapes being held together by an appropriate adhesive material (no reference number). The layer 9 holds the filler member 6 in place and contributes to the mechanical strength of the cable 1 if necessary. Accordingly, the tapes 10 have a modulus of elasticity that is preferably between 20 000 N/mm$^2$ and 45 000 N/mm$^2$.

If it is not made up exclusively of the reinforcing tapes 10, the layer 9 can contain approximately 10% of tapes adapted to swell in the presence of a liquid in order to seal the cable 1 at the level of the optical fibers 4.

Optionally, a second layer 11 similar to the first layer 9 can be applied around the latter, wound in the opposite direction to obtain a neutral plane of curvature on flexing of the cable 1.

Finally, the cable 1 of the invention includes an outer sheath 12 of high-density polyethylene, for example. More generally, the material of the sheath 12 is one having a high modulus of elasticity, in the order of 1 300 N/mm$^2$ and preferably between 1 000 N/mm$^2$ and 4 000 N/mm$^2$.

The optional layers 9 and 11 in combination with the filler members 6 restrict excessive contraction of the outer sheath 12 in response to variations in temperature. They also provide an effective seal for the cable 1.

In accordance with the present invention, the filler members 6 can advantageously be chosen to have a modulus of elasticity in traction and an elongation at break greater than those of the fibers 4. This makes it possible to dispense with additional reinforcing members in the outer sheath 12 (as shown in FIG. 1) or to reduce the cross-section of these reinforcing members, and thereby to reduce the thickness of the outer sheath and therefore the outside diameter of the cable 1. The reinforcing members can be dispensed with if the modulus of elasticity of the filler members 6 is between 25 000 N/mm$^2$ and 55 000 N/mm$^2$ and their elongation at break is 2% or greater.

The invention reduces the diameter of an optical fiber cable of the type comprising stacked ribbons by providing a tighter structure around the stack of ribbons, eliminating the internal protective tube and optionally eliminating the reinforcing members in the outer sheath, or reducing their cross-section.

In a cable of the invention, contraction of the structure due to temperature variations does not cause a contraction to be absorbed by the ribbons greater than that occurring in prior art cables. For example, the total contraction of the cable when subjected to a given fall in temperature is less than 0.1% and can vary between 0.03% and 0.08%. For the same temperature fall in the prior art the contraction of the cable is between 0.15% and 0.2%. This shows that the structure of the cable in accordance with the invention provides better protection of the optical fibers against contraction of the cable.

For the same cross-section, the cable 1 of the invention is also stronger in traction than the prior art cable. In a prior art cable, for a 0.15% maximal authorized elongation of the optical fibers, the maximum load in traction that the cable can withstand is 1 740 N. This load is 2 610 N for a cable in accordance with the invention.

The cable 1 of the invention is additionally less costly to manufacture than the prior art cables because of the lower proportion of plastics materials that it contains.

Finally, the cable of the invention is more fire resistant than the prior art cables, also because of its reduced plastics material content and its higher content of vitreous or like materials.

One possible method of manufacturing a cable in accordance with the invention such as the cable 1 will now be described with reference to FIG. 3 which is a schematic representation of an appropriate manufacturing device 100.

Figure 3:
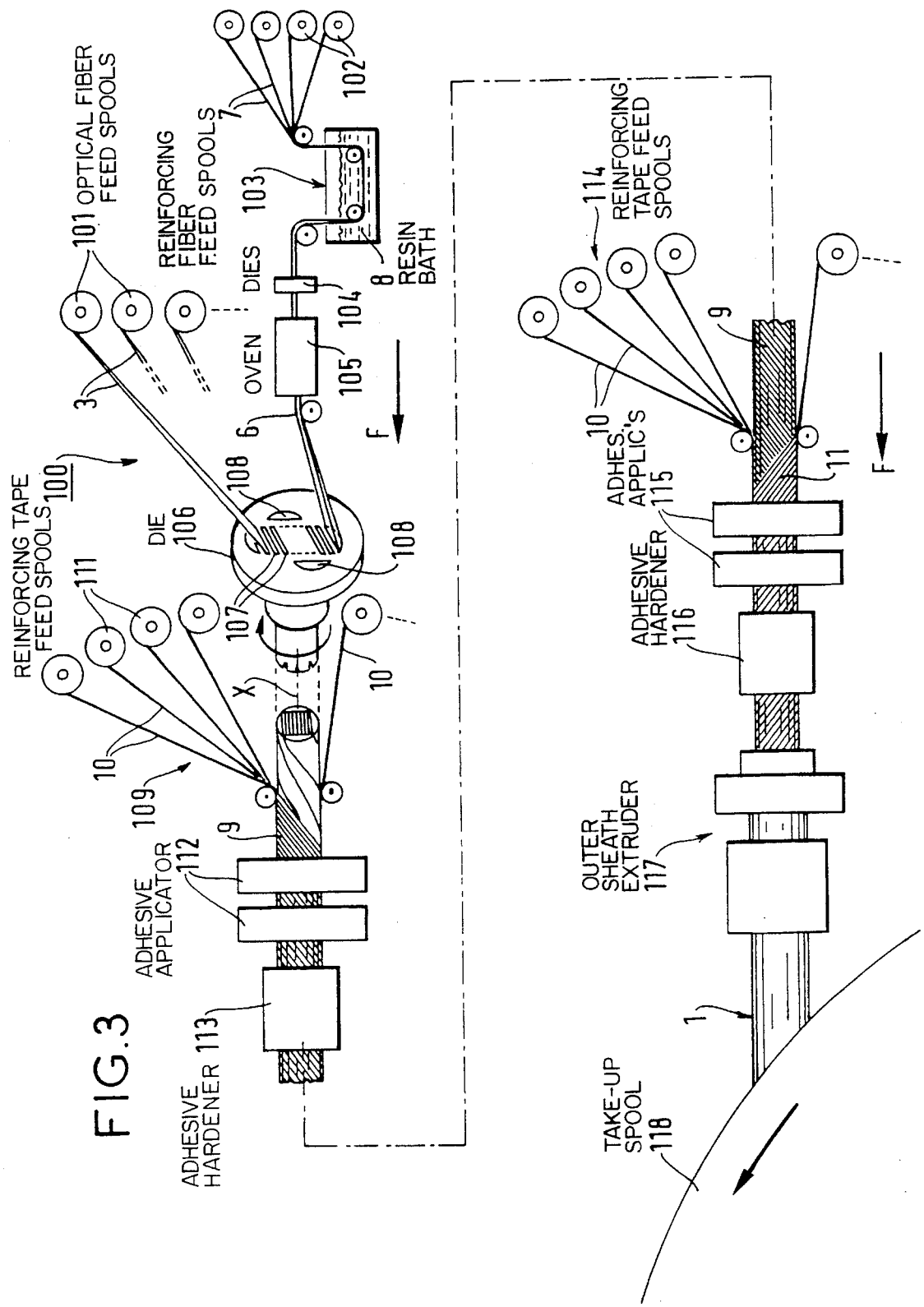
FIG. 3 is a simplified schematic of a device for manufacturing a cable of the invention.

The device 100 comprises eight feed spools 101 of optical fiber ribbons 3 (only three of them are shown in FIG. 3 to simplify the diagram). It further comprises, parallel to the feed spools 101, four series of feed spools 102 of reinforcing fibers 7 (only one such series is shown in FIG. 3, for simplicity, and in practise there are as many series of feed spools 102 as there are filler members 6 incorporated into the structure of the cable 1), followed—in the direction of movement of the ribbons through the device 100 shown by the arrow F—by a bath 103 of a resin 8 that can be polymerized by heat or by ultraviolet light, followed by a set of four dies 104 (only one of which is shown in FIG. 3) through which the fibers 7 coated with resin 8 are passed to give them the required cross-section (part of a disk in the example of the cable 1). The dies 104 are followed by an oven 105 for polymerizing the resin 8 by heating it or by ultraviolet light, as appropriate to the type of resin, which hardens the resin and so terminates manufacture of the filler members 6.

The ribbons 3 from the feed spools 102 and the filler members 6 then pass through a second die 106 that places the various members in their final positions in the cable 1. To this end the die 106 has a vertical row of rectangular openings 107 for the ribbons 3 and four openings 108 in the shape of portions of disks around the openings 107 and substantially corresponding to the cross-section of the filler members 6. To form the SZ or constant twist structure of the stack 2 the die 106 can be rotated about the feed axis X of the device 100, for example.

The die 106 is followed by a station 109 for applying the reinforcing tapes 10 at which the tapes 10 are payed off from a plurality of feed spools 111 and wound helically around the assembly comprising the ribbons 3 and the filler members 6. The station 109 is followed by means 112 for applying the adhesive connecting material to form the layer 9 and then a device 113 to harden that material.

On the downstream side of the device 113 is a second applicator station 114 for applying the tapes 10, identical to the station 109 except that it wraps the tapes 10 helically in the opposite direction to the station 109. The station 114 is likewise followed by means 115 for applying the adhesive connecting material to the tapes 10 and a device 116 for hardening this material.

Finally, the device 100 comprises means 117 for extruding the outer sheath 12 around the resulting assembly and a take-up spool 118 for the completed cable 1.

Of course, the invention is not limited to the specific embodiment just described.

In particular, and especially if the cable structure is not entirely tight, a sealing gel, filaments that swell in the presence of liquid or a powder that swells in the presence of liquid can be disposed between the filler members 6 and the stack of ribbons 2.

More generally, to improve the sealing of a cable in accordance with the invention the assembly of filler members can be covered with a sealing gel or any other appropriate sealing coating.

The layers 9 and 11 of reinforcing tapes 10 are not indispensable and they may be omitted from the cable of the invention. Note that these layers are always disposed in such a way as to obtain a neutral plane of curvature on flexing of the cable.

The cross-section of the stack is not necessarily rectangular. It can be any shape, especially if not all the ribbons used are the same width. In this case the cross-section of the filler members is matched to the contour of the stack of ribbons in such a way as to occupy the least possible space.

If the filler members do not fulfil the role of reinforcing members, then reinforcing members are inserted into the outer sheath 12 as in the prior art cables.

Figure 4:
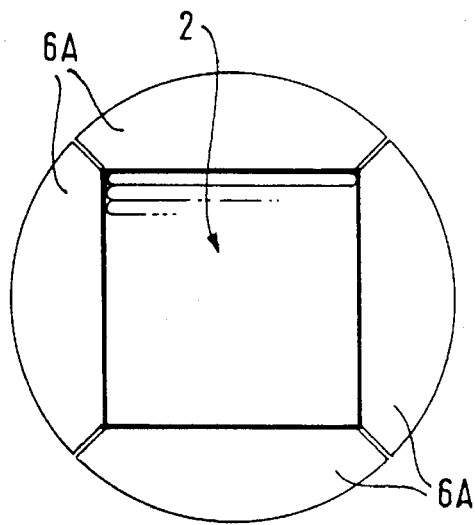
FIG. 4 is a view in cross-section of a first variant of the cable of the invention.

The cross-section of the filler members 6 is not necessarily that shown in FIGS. 1 and 2. FIG. 4 shows in a highly schematic form another possible cross-section for the filler members 6A.

Figure 5:
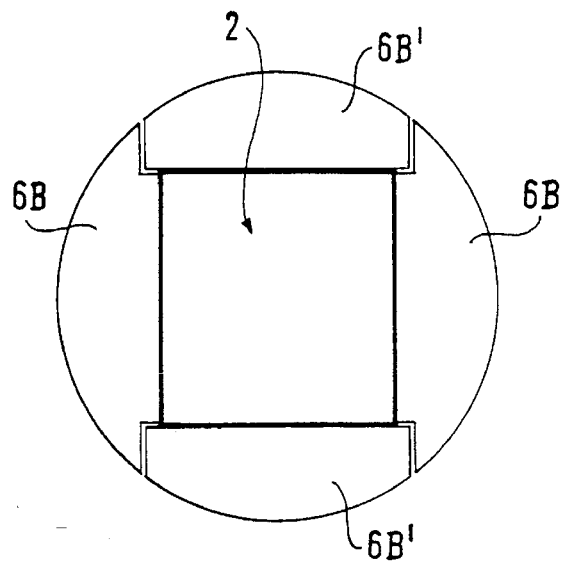
FIG. 5 is a view in cross-section of a second variant of the cable of the invention.
Figure 6:
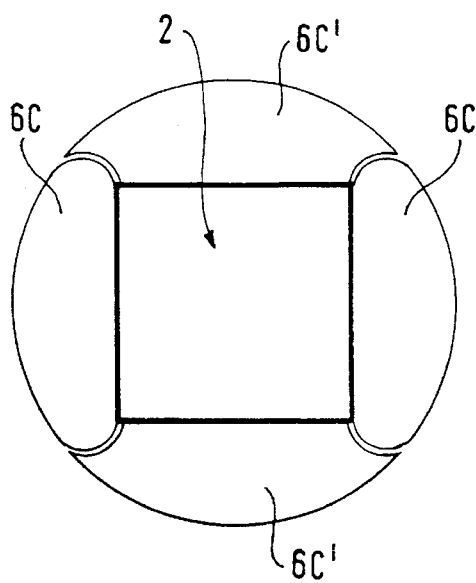
FIG. 6 is a view in cross-section of a third variant of the cable of the invention.
Figure 7:
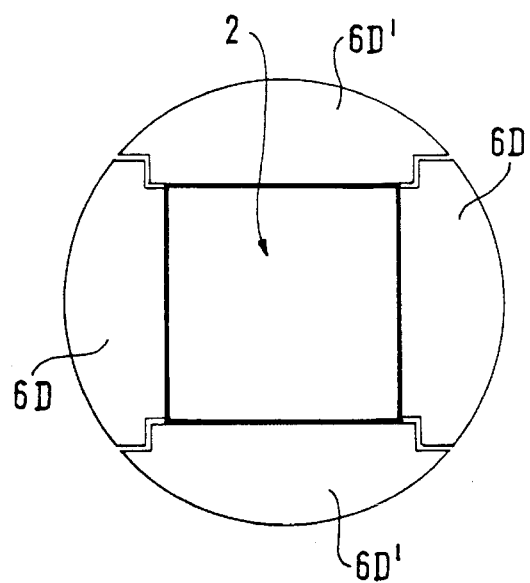
FIG. 7 is a view in cross-section of a fourth variant of the cable of the invention.

FIGS. 5, 6 and 7 show, also highly schematically, variant cross-sections of the filler members 6B and 6B', 6C and 6C' and 6D and 6D', respectively, in which these filler members have shoulders or grooves adapted to cooperate with corresponding shoulders or ribs on the adjacent filler members in order to hold the filler members together better.

To obtain an SZ or helical structure of the stack 2, rather than rotating the die 106 about the axis X in the device 100, a spool rotating about the X axis could be provided immediately downstream of the device 113 and the layer 11 formed on a different line.

Finally, all materials and numerical values given herein are given by way of example only.

There is claimed:

1. Optical fiber cable comprising:

a stacked plurality of optical fiber ribbons each including a plurality of optical fibers disposed side by side in substantially the same plane and all embedded in a common covering or matrix of said ribbon, a protective outer sheath to protect the cable against radial compression loads, reinforcing members for withstanding traction loads applied to the cable, which further comprises filler members of a material based on reinforcing fibers and having a coefficient of expansion similar to that of said optical fibers embedded in a connecting matrix, said filler members occupying all or part of a volume delimited by the outside surface of the stacked ribbons and by the inside surface of said outer sheath so that the combination of said stack and said filler members has an external contour in cross-section that is substantially circular, said filler members being adapted to protect said ribbons against radial and longitudinal loads applied to said cable and to oppose contraction of said cable by more than 0.2%.

2. Cable according to claim 1 wherein said filler members are surrounded by at least one layer of reinforcing tapes assembled together by an adhesive connecting material, said layer holding said filler members in place around said stack.

3. Cable according to claim 2 wherein said reinforcing tapes are wrapped helically around said filler members.

4. Cable according to claim 3 wherein a second layer of reinforcing tapes is placed around the first with the opposite winding direction.

5. Cable according to claim 1 wherein said reinforcing members comprise said filler members which accordingly have a modulus of elasticity between 25 000 N/mm$^2$ and 55 000 N/mm$^2$ and an elongation at break of at least 2%.

6. Cable according to claim 5 wherein, if the coefficient of expansion of said filler members is less than $20.10^{-6}$ and their modulus of elasticity is greater than 25 000 N/mm$^2$, the ratio between the cross-section of said stack and that of the volume delimited by the inside contour of said filler members is substantially equal to 1.

7. Cable according to claim 1 further comprising means for providing a seal at the level of said optical fibers.

8. Cable according to claim 7 wherein said said seal is one sealing material selected from the group consisting of a sealing gel in which said stack is embedded, filaments adapted to swell in the presence of a liquid and inserted between said stack and said filler members, and a powder adapted to swell in the presence of a liquid and inserted between said stack and said filler members.

9. Cable according to claim 1 wherein the ratio between the cross-section occupied by said connecting matrix and the total cross-section of one of said filler members is between 10% and 25%.

10. Cable according to claim 1 wherein said stack is twisted upon itself with a constant or alternating twist.

11. Cable according to claim 1 characterized in that the modulus of elasticity of said filler members is between 10 000 N/mm$^2$ and 55 000 N/mm$^2$.

12. Cable according to claim 1 wherein the ratio between the cross-section of said stack and that of the volume delimited by the inside contour of said filler members is between 0.5 and 1.

13. Cable according to claim 1 wherein, if the coefficient of expansion of said filler members is less than $8.10^{-6}$ and their modulus of elasticity is greater than 25 000 N/mm$^2$, the ratio between the cross-section of said stack and that of the volume delimited by the inside contour of said filler members is substantially equal to 1.

14. Cable according to claim 1 wherein the assembly made up of said filler members is covered with a sealing gel or a suitable sealing covering.

15. Device for manufacturing a cable according to claim 1, comprising:

ribbon feed means, reinforcing fiber feed means, means for applying said connecting material to said reinforcing fibers assembled together to form said filler members, a die for imparting the appropriate shape to said filler members before the connecting material thereof has solidified, means for solidifying said connecting material, means for assembling said ribbons from the feed means therefor to form said stack, means for disposing said filler members around said stack, and means for forming said outer sheath around said filler members.

16. Device according to claim 15 wherein said means for assembling said ribbons and said means for disposing said filler members around said stack comprise a member rotating about an axis along which said cable moves through said device, said member having spaced openings along said axis through which said stack and said filler members can pass so that on leaving said member said ribbons are assembled together and surrounded by said filler members.

* * * * *